United States Patent [19]

Obata

[11] 4,345,573
[45] Aug. 24, 1982

[54] BLOW-GAS TREATING AND CONTROLLING SYSTEM

[75] Inventor: Haruyuki Obata, Susonoshi, Japan

[73] Assignee: Toyota Jidosha Kogyo Kabushiki Kaisha, Aichi, Japan

[21] Appl. No.: 141,170

[22] Filed: Apr. 17, 1980

[30] Foreign Application Priority Data

May 16, 1979 [JP] Japan .................................. 54-59083

[51] Int. Cl.$^3$ .......................................... F02M 23/14
[52] U.S. Cl. ...................................... 123/572; 123/573
[58] Field of Search ............... 123/572, 573, 574, 568; 261/50 A, DIG. 58

[56] References Cited

U.S. PATENT DOCUMENTS

| | | | |
|---|---|---|---|
| 1,635,007 | 7/1927 | Orem .................................. | 123/573 |
| 3,272,192 | 9/1966 | Jensen et al. ..................... | 123/572 |
| 3,500,806 | 3/1970 | Sarto ................................. | 123/572 |
| 4,089,311 | 5/1978 | Brettschneider ................. | 261/50 A |
| 4,262,639 | 4/1981 | Motosugi ........................... | 123/568 |

*Primary Examiner*—Ronald H. Lazarus
*Attorney, Agent, or Firm*—Browdy and Neimark

[57] ABSTRACT

A blow-by gas treating and controlling system in which blow-by gas accumulated in the crank chamber of an internal combustion engine is induced by means of the vacuum generated at a portion of the throttle barrel of the carburetor above the throttle valve, the level of vacuum established in that region being proportional to the flow rate of the intake mixture. The blow-by gas is then mixed with the fresh air-fuel mixture and burnt together with the latter. Generation of an excessively high vacuum in the crankcase, which may take place when the rate of generation of the blow-by gas is small, is avoided because of the presence of a bleed pipe which is connected between the blow-by gas treating pipe and the air cleaner of the engine and adapted to supply suplementary air to the blow-by gas through orifice. Also, an excessively high pressure generated in the crank chamber is relieved through this bleed pipe which acts in this case as a safety by-pass passage.

3 Claims, 5 Drawing Figures

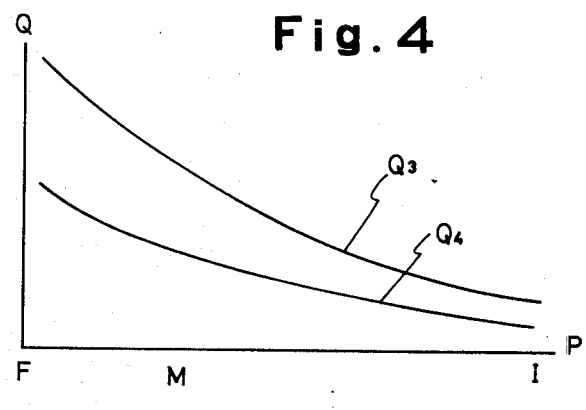
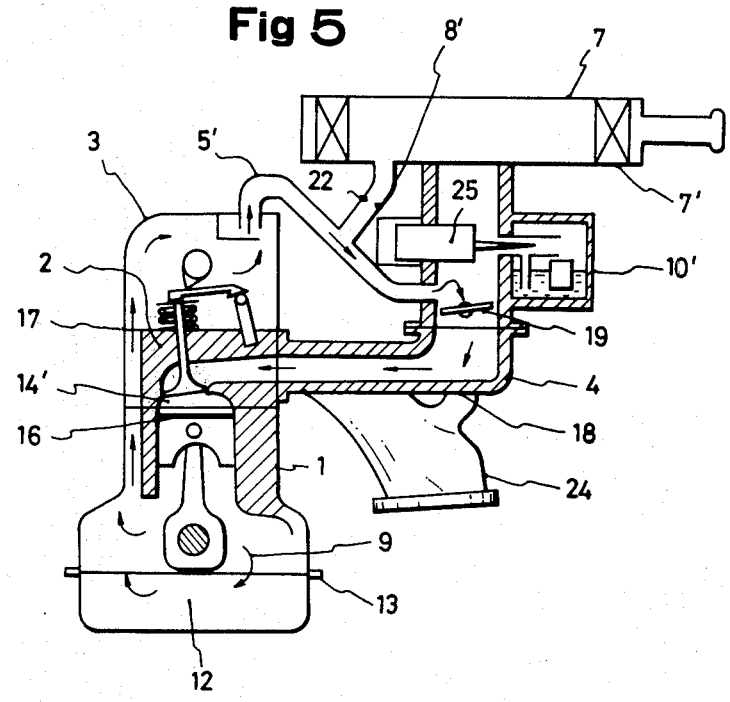

BLOW-GAS TREATING AND CONTROLLING SYSTEM

BACKGROUND OF THE INVENTION

The present invention relates to a system for treating and controlling blow-by gas in the crankcase of an internal combustion engine and, more particularly, to a blow-by gas treating and controlling system having a blow-by gas pipe interconnected between the cylinder head cover of the engine and the carburetor barrel to ventilate the cylinder head cover and, hence, the crankcase. Still more particularly, the invention is concerned with a blow-by gas treating and controlling device of the kind described, wherein the blow-by gas treating pipe is connected directly to the vacuum area of the throttle barrel of variable venturi or other carburetor upstream from the throttle valve, without making use of a PCV valve so that the blow-by gas is induced by the vacuum which is generated in accordance with the flow rate of intake air-fuel mixture, the system further having a bleed pipe interconnected between the blow-by gas treating pipe and the air cleaner of the engine to maintain a balance of pressure in the crankcase.

As is well known, in the internal combustion engine, a so-called blow-by gas is emitted in the crankcase as a result of leaks of intake air-fuel mixture and combustion gas through the clearances around piston rings, during compression and combustion or exhaust cycle. Crankcase forced ventilation systems cycle the blow-by gas and burning the same together with the intake air-fuel mixture. In fact, there is a trend in various countries to develop such a system and to enact a regulation for the equipment of such a system.

Hitherto, it has been clarified that the blow-by gas generally has the following features.

(1) The blow-by gas is an admixture of the intake air-fuel mixture and the combustion gas, the rate of mixing being 85:15. Thus, the major component of the blow-by gas is the air-fuel mixture which is combustible.

(2) The blow-by gas contains 20,000 ppm of hydrocarbon which amounts to an air-fuel ratio of 15.

(3) Ten (10) liters of blow-by gas contains about 0.5 gr of water content.

(4) The water component exhibits a PH value of 2. Further, 200 to 400 ppm of $SO_4^{--}$ and 30 to 60 ppm of $Cl^{--}$ are contained by the blow-by gas.

FIG. 1 shows a typical conventional blow-by gas ventilation system making use of a PCV valve and the vacuum established in the intake manifold. More specifically, the head cover 3 of cylinder head 2 of an engine 1 is communicated with an intake manifold 4 through a blow-by gas ventilation pipe 5 to the base portion of which attached is a so-called PCV valve (Positive Crankcase Ventilation Valve) which is known per se and designated at a reference numeral 6. Also, a bleed pipe 8 is connected to the air cleaner 7. The arrangement is such that the blow-by gas 9 from the crank chamber is induced as shown by a full line so as to be mixed with the fresh mixture supplied through the carburetor and burnt together with the fresh mixture.

Since the operation of this known system relies upon the vacuum P in the intake manifold, the flow rate $Q_1$ of the gas flowing through the PCV valve 6 is greater than rate $Q_2$ of accumulation of the blow-by gas in the operation range over the idling region I and medium load region M, so that fresh air-fuel mixture is introduced into the crankcase 12 at a rate B, while the blow-by gas is induced at a rate A into the intake manifold 4 through the PCV valve 6 and the blow-by gas treating pipe 5. In the full-load region F, the rate of discharge of the blow-by gas is increased naturally, whereas the flow rate of the gas flowing through the PCV valve 6 is reduced because of reduction of the intake manifold. As a countermeasure for compensating for the reduction of the flow rate of the gas, the blow-by gas is expelled from the crank chamber 12 to the air cleaner 7 through a bleed pipe 8, so that the blow-by gas is mixed with the fresh mixture introduced through the carburetor 10 and burnt together with the fresh mixture.

Thus, this system has flexibility to change the path of blow-by gas in accordance with the state of operation of the engine corresponding to the level of load imposed thereon. This system, however, has various disadvantages. Namely, the oil mist and/or moisture contaminates or blocks small holes such as that of the air bleed, as the blow-by gas flows through the carburetor from the air cleaner, resulting in an undesirable change of air-fuel ratio characteristic of the engine.

At the same time, oil mist and moisture attach to the air cleaner element or to the inside of the air cleaner to increase the filtration resistance resulting not only in the reduction of the engine output but also an icing in the small venturi portion of the carburetor to hinder the smooth operation of the engine.

In case of a variable-venturi type carburetor, the smooth movement of the suction piston is lost due to the attaching of oil mist and water. In the worst case, the suction piston becomes immovable due to sticking.

SUMMARY OF THE INVENTION

In view of the above-described shortcomings of the conventional blow-by gas treating system, the present invention aims as its major object at providing an improved blow-by gas treating and controlling system which can treat the blow-by gas at a rate proportional to the flow rate of intake air, in synchronism with the generation of the blow-by gas, making use of the vacuum established at the upstream side of the throttle valve of the carburetor, without requiring the aid of the PCV valve.

BRIEF DESCRIPTION OF THE DRAWINGS

FIG. 4 is a graph showing the relationship between the intake manifold vacuum in the vacuum region of the throttle barrel and the flow rate of the intake mixture; and FIG. 5 is a schematic illustration of another embodiment.

DESCRIPTION OF THE PREFERRED EMBODIMENTS

Figure 1:
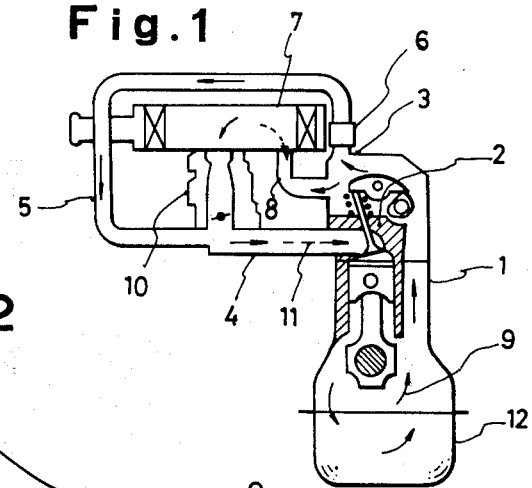
FIG. 1 is a schematic illustration of a blow-by gas treating system of the prior art.
Figure 2:
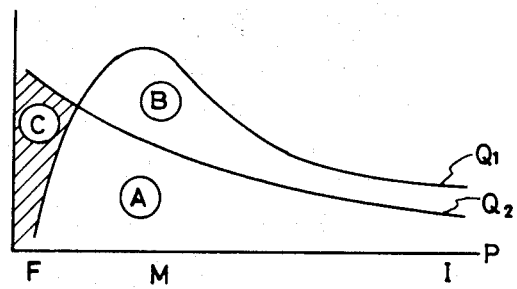
FIG. 2 is a graph showing the relationship between the intake manifold vacuum and the flow rate of gas in the PCV valve, as well as rate of discharge of the blow-by gas, observed in the system shown in FIG. 1.
Figure 3:
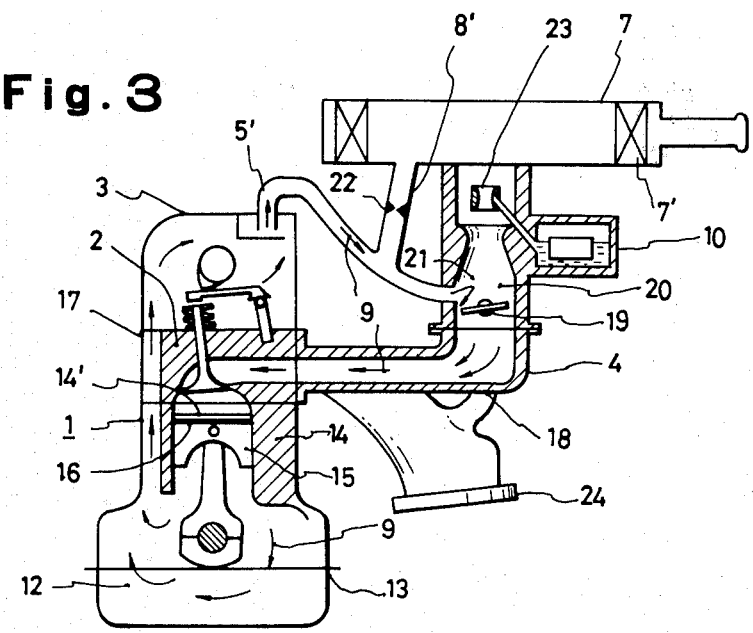
FIG. 3 is a schematic illustration of an embodiment of the invention.

Referring first to FIG. 3 showing a first embodiment of the invention, reference numeral 1 denotes a reciprocating type internal combustion engine. The engine 1 has a crankcase 12 provided with a gasket portion 13. A cylinder block 14 and a piston 15 adapted to reciprocatingly move in the latter define in combination a combustion chamber 14' on the crankcase 12. During the operation of the engine, blow-by gas 9, which consists of the fresh air-fuel mixture and combustion gas leaked through clearances around piston rings 16 of the piston 15, is emitted in to the crankcase 12.

The engine 1 has a cylinder head 2 having a cover 3 and mounted on the crankcase through the medium of a gasket portion 17. A carburetor 10 is mounted on an intake manifold 4 having a heat riser portion 18. The carburetor has a throttle barrel 20 at the upstream side of a throttle valve 19 and including a vacuum region 21. Between the cover 3 of the cylinder head 2 and the vacuum region 21, connected is a blow-by gas treating pipe 5' which constitutes an essential feature of the invention. Also, a bleed pipe 8' having an orifice 22 is connected between the blow-by gas treating pipe 5' and the interior of the element 7' of an air cleaner 7 mounted on the carburetor 10.

Reference numerals 23 and 24 denote, respectively, a small venturi and an exhaust manifold.

In operation, as the engine is started, the blow-by gas 9 is emitted in the crankcase 12 as stated before, and reaches the space inside the head cover 3 in a known manner. As shown in FIG. 4, in the vacuum region 21 of the throttle barrel 20, the vacuum P established in the intake manifold and the flow rate $Q_3$ of the intake air-fuel mixture are increased in proportion to the increase of the load, over the entire range of load including idling region I, medium-load region M and the full-load region F. In consequence, the blow-by gas 9 filling the head cover 3 is subjected to a vacuum which is proportional to the load, through the blow-by gas treating pipe 5'.

As a result, the blow-by gas is sucked and flows through the throttle valve 19 so as to be mixed with the fresh air-fuel mixture in the mixing chamber and is introduced into the combustion chamber 14' through the intake manifold 4. The blow-by gas is then burnt together with the fresh air-fuel mixture and exhausted thereafter.

The result of an experiment shows, as will be seen from FIG. 4, that the rate $Q_4$ of discharge of the blow-by gas has a relation to the intake manifold vacuum P similar to that of the flow rate of the intake mixture.

Therefore, the vacuum at the vacuum region 21 of the throttle barrel 20 above the throttle valve 19 is maintained at a high level proportional to the flow rate of the intake mixture. This increase of the vacuum takes place in synchronism with the generation of the blow-by gas, so that this vacuum can suitably be used for inducing the blow-by gas.

The rate of generation of the blow-by gas often fluctuates depending on the state of operation of the engine. In case where the blow-by gas is generated at an extraordinary large rate, the pressure in the crankcase could be so increased as to cause a leak of oil through the gasket portion 13. Also, when the rate of generation of the blow-by gas is extraordinarily small, the ambient air may be caused to leak into the crank chamber through the gasket portion 13.

According to the invention, in the former case, the blow-by gas flows bypassing the air cleaner 7, through the bleed pipe connected to the blow-by gas treating pipe 5' and having an orifice 22. This, however, takes place seldom because the balance is automatically maintained between the flow rate of intake mixture and the rate of generation of blow-by gas, thanks to the operation of the vacuum region 21 of the throttle barrel 20. Thus, the air bleed pipe merely constitutes an emergency safety means.

Rather, the bleed pipe 8' effects an air bleed from the air cleaner 7, when the rate of generation of the blow-by gas is specifically low as in the case of idling, thereby to prevent the pressure in the crankcase 12 from becoming excessively low due to an excessive ventilation and, hence, to exclude the invasion by ambient air.

FIG. 5 shows another embodiment of the invention applied to an internal combustion engine having a suction-piston type variable venturi carburetor 10'. This embodiment provides advantages substantially same as those performed by the preceding embodiment. The suction piston of the carburetor 10' is designated at a reference numeral 25.

Needless to say, the described embodiment is not exclusive and various changes and modifications may be imparted thereto. For instance, a variable or adjustable orifice is used as the orifice of the bleed pipe. By so doing, it is possible to suitably control the rate of air bleed and to prevent an over temperature of the catalytic convertor which often takes place during high-speed operation.

The tendency of the icing is more remarkable in the throttle valve 19 than in the suction piston 25, in the carburetor-return process of the blow-by gas during running in the cold district. This, however, is avoided almost perfectly because the throttle valve 19 is located in the vicinity of an exhaust manifold and the heat riser.

As has been described, according to the invention, a blow-by gas treating pipe is connected between the cylinder head cover of the engine and the vacuum region of the throttle barrel above the throttle valve of the carburetor. The vacuum established in that region is basically proportional to the flow rate of the intake mixture. It is quite convenient and advantageous to use this vacuum as the driving force for inducing the blow-by gas, because, by so doing, it becomes possible to make an effective use of the synchronism between the change of rate of blow-by gas generation and the change of flow rate of the intake mixture. In consequence, a single process for recycling the blow-by gas to the burning through the vacuum region of the throttle barrel is maintained irrespective of the level of the intake manifold, i.e. irrespective of the level of the load. This feature in turn ensures quite a simple construction and operation of the system as a whole.

Accordingly, the system of the invention provides stable engine operation without causing any disturbance of the air-fuel ratio of the mixture formed in the carburetor, while achieving quite an efficient disposal or treatment of the blow-by gas. In addition, it is quite advantageous that the pressure in the crankcase is maintained always at an optimum level because it is induced at a rate matching the rate of generation of the same, so that the undesirable leak of oil or leak of air into the crankcase is avoided.

According to the invention, it is not necessary to recycle the blow-by gas to the upstream side of the variable venturi or other carburetor, particularly to the air cleaner, even when the intake manifold vacuum is low. Consequently, the contamination and clogging of the air cleaner element and air bleed, as well as disorder of the carburetor, are completely eliminated to ensure a smooth and stable operation of the engine.

The elimination of the PCV valve permits a corresponding reduction of cost, and offers easier maintenance and compact construction thanks to the reduction of the number of parts.

The bleed pipe connected between the blow-by gas treating pipe and the air cleaner permits the additional supply of air or relief of excessive air even when an extremely low or high pressure is established in the crankcase.

Finally, it is possible to protect the catalytic converter against over temperature by designing the system to permit the adjustment of the air bleed.

What is claimed is:

1. A blow-by gas treating and controlling system having a blow-by gas treating pipe connected between the cylinder head cover of an engine and the barrel of a variable venturi carburetor attached to said engine, said variable venturi carburetor including a throttle valve mounted downstream of said barrel, characterized in that said blow-by gas treating pipe is connected between said cylinder head of said engine and the vacuum region of said barrel above the throttle valve of said variable venturi carburetor, said blow-by gas treating pipe is unrestricted between said cylinder head and said barrel, and a bleed pipe connected at one end to said blow-by gas treating pipe intermediate its ends and at its other end to an air cleaner attached to the suction side of said carburetor upstream of said throttle valve.

2. A blow-by gas treating and controlling system as claimed in claim 1, wherein said bleed pipe is provided with an orifice.

3. A blow-by gas treating and controlling system as claimed in claim 2, wherein said orifice is an adjustable orifice.

* * * * *